Figure 2:
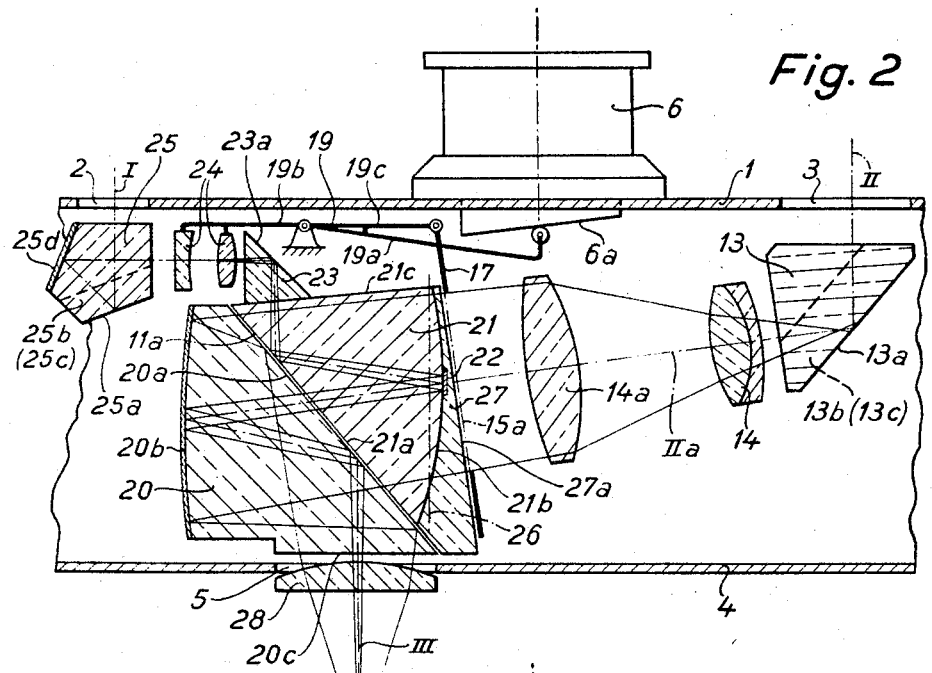

INVENTORS
ERNST LEITZ
WILHELM STEIN

By Toulmin & Toulmin
Attorneys

United States Patent Office 3,397,606
Patented Aug. 20, 1968

3,397,606
RANGE FINDER AND VIEW FINDER FOR
PHOTOGRAPHIC CAMERAS
Ernst Leitz and Wilhelm Stein, Wetzlar (Lahn), Germany,
assignors to Ernst Leitz, Gesellschaft mit beschränkter
Haftung, Wetzlar (Lahn), Germany
Filed Aug. 24, 1962, Ser. No. 219,281
Claims priority, application Germany, Aug. 26, 1961,
L 39,875
12 Claims. (Cl. 88—2.7)

The present invention relates to a coinciding type range finder for photographic cameras, more particularly, to such a range finder having a simplified optical arrangement and occupying a smaller distance along the optical axis of the camera.

The coinciding type range finder for photographic cameras generally comprises prism telescopes which form intermediate images from the light paths of the view finder and the range finder. A reflector is positioned at or in the vicinity of the intermediate image plane of the range finder and limits the dimensions of the image field. The reflector then reflects the light rays from both intermediate images into a common ocular through which the intermediate images are viewed.

This type of range finder has the advantage in that equally brilliant range and view finder images are formed and which appear sharply defined with respect to each other. Such range finders which have been previously constructed require a complex optical system with sharply curved optical faces so that the cost of manufacturing such range finders is relatively expensive. Further, such range finders require a considerable distance in the direction of the optical axis of the ocular so that it is virtually impossible to utilize such range finders in the confined space of a miniature camera. These range finders also have an unfavorable position for the eye of the viewer which position can only be improved by further additions to the optical system which require additional costs and more space in the camera.

Attempts have been made to simplify the optical arrangement of such range finders by providing in the intermediate image plane of the range finder telescope a reflecting lens having an annular reflecting coating on that portion of the reflecting lens which functions as a condenser lens for the light rays entering from the view finder. The uncoated portion of the reflecting lens admits the range finder light rays into the view finder light rays whereby the uncoated portion of the lens exerts a condensing lens effect on the light rays from the range finder. When this condensing lens is combined with a prism which is common to the light paths from both the range finder and the view finder it is possible to obtain a smaller distance of the optical arrangement in the direction of the ocular axis. However, the problem remains of providing a relatively expensive ocular in order to obtain a satisfactory eye position when the range finder is used by persons wearing glasses.

A particular disadvantage of the above-described structure is the use of the space of the intermediate image plane for the reflecting condenser lens, since it is no longer possible to position in the same space a structure for selectively limiting the image field of the view finder image. It has therefore been proposed to position several image field limiting marks coordinated to different focal lengths of the exchangeable camera objectives. These marks are translucent and made in the reflecting coating of the lens, but require additional optical elements for proper illumination thereof. In many cases it was felt by the user of the range finder that the presence of such image markings which are permanently visible in the view finder image was disturbing to the impression of the image.

It is therefore the principal object of the present invention to provide a novel and improved coinciding type range finder for a photographic camera.

The range finder of the present invention essentially comprises positioning in the path of the ocular at least one concave reflector and a total reflecting surface coordinated to the concave reflector for viewing both of the intermediate images formed from the view finder and the range finder. The concave reflector and the total reflecting surface are positioned in the path of light rays of the ocular and are so inclined with respect to each other that these light rays on their way from the intermediate images to the concave reflector to the ocular are reflected once by the total reflecting surface and pass once through the total reflecting surface.

This range finder of the present invention takes advantage of the more favorable imaging properties of the concave reflector as compared with the corresponding optical lens system. At the same time the distance of the telescope systems of the view finder and range finder are reduced along the axis of the ocular where the total reflecting surface is coordinated to said concave reflector.

The structure of the telescope systems of the present invention can be further simplified by arranging the total reflecting surface and the concave reflector as surfaces of a prism positioned in the systems of prisms of the range finder and view finder telescopes. This prism is then common to both of the light paths of these telescopes and the total reflecting surface in the prism system of at least one of the two telescopes has the effect of inverting the reversed image.

In one embodiment of the present invention the planes of the view finder and range finder intermediate images are so positioned that they intercept at a common point on the axis of the view finder telescope. In the plane of the range finder intermediate image there is positioned a small reflecting surface which determines in a known manner the dimension of the centrally arranged measuring image. This reflecting surface reflects the light rays of the range finder toward a concave reflector which then reflects both of the light rays from the view finder and range finder telescopes to the ocular.

This arrangement of the intermediate image planes and the reflecting surface for the measuring image results in a sharply defined image of the measuring image as well as of the intermediate images. This is particularly true where the plane of the range finder intermediate image and the reflecting surface are slightly inclined with respect to the image plane of the view finder intermediate image. This inclination of the reflecting surface with respect to the plane of the view finder intermediate image is necessary, because the total reflecting surface is coordinated to the concave reflecting surface for the ocular. A variable diaphragm positioned in the plane of the view finder intermediate image will always be sharply defined to the viewer.

In a modification of this invention the two intermediate image planes are spaced from each other axially and a reflecting field positioned between these two image planes so that when the intermediate images are viewed through the concave reflecting surface of the ocular the virtual intermediate image of the range finder appears horizontally in the intermediate image plane of the view finder. It must be observed that the reflecting surface for the measuring image and the intermediate image plane of the view finder together with a variable diaphragm coordinated to this image plane are so spaced in the axial direction that they remain within the range of accommodation of the human eye. This arrangement permits a greater latitude in the construction of the optical elements of the telescope systems for the view finder and range finder, particularly since one of the prism surfaces of the image inverting systems of prisms may be used as a supporting surface for reflecting the measuring image.

As a result of this modification the reflection of the measuring image together with the intermediate images is sharply defined to the viewer, so that the view finder image and the measuring image are sharply distinct from each other. By providing a completely reflecting coating only the separate range finder image can be measured, but by providing a partially translucent reflecting coating both of the images can be viewed. The surface upon which this reflecting coating is provided can be curved so that the reflector of the measuring image has the effect of a condenser lens on the light path from the range finder.

Figure 1:
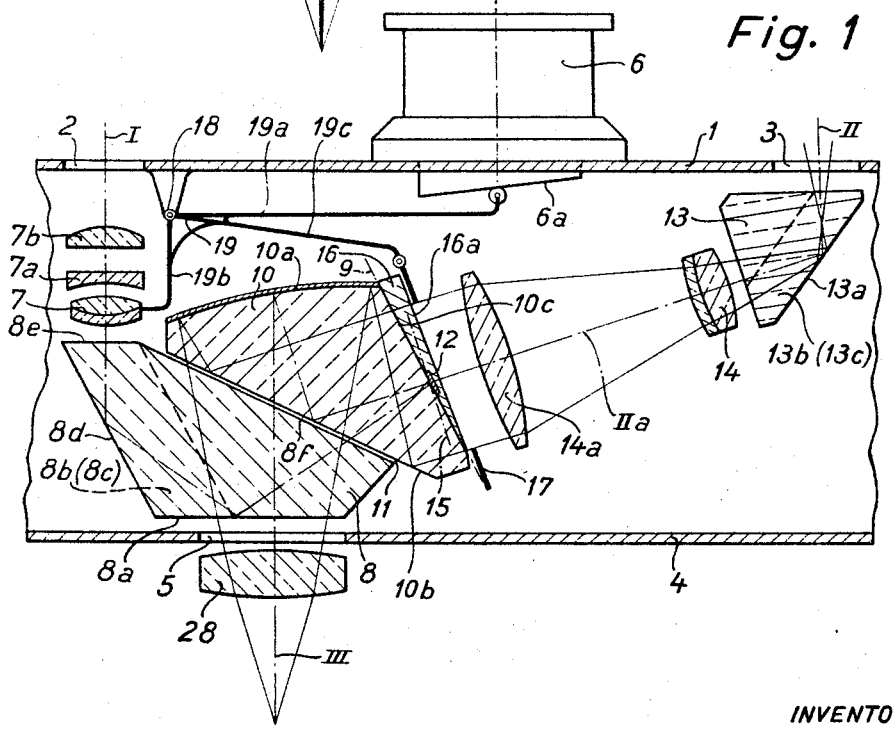

Other objects and advantages of the present invention will be apparent upon reference to the accompanying description when taken in conjunction with the following drawings, wherein:

FIGURE 1 is a top plan view of an optical system of a coinciding type range finder according to the present invention wherein the intermediate image planes intersect in a common point on the optical axis; and FIGURE 2 is a modification of the range finder of the present invention wherein the intermediate image planes are positioned axially spaced from each other and a measuring reflecting surface positioned therebetween.

A specific embodiment and a modification of the present invention will next be described in detail with reference to the drawings wherein like reference symbols indicate the same parts throughout the various views.

With reference to FIGURE 1, there is illustrated therein in cross-section a portion of a camera casing comprising a front wall 1 having an aperture 2 therein for the range finder or measuring telescope and an aperture 3 for the view finder telescope. The distance between the optical axis of the range finder light rays I and the optical axis of the view finder light rays II provides a basis upon which the measurements are made.

The casing is provided with a rear wall 4 in which is a viewing aperture 5 which is common to both of the aforementioned telescopes. A preferably exchangeable objective 6 for the camera is mounted in the conventional manner on the front wall 1 of the casing.

An objective 7 for the measuring telescope is positioned in the camera casing behind the aperture 2 and is coordinated with objective lenses 7a and 7b for extending rearwardly the focal length.

Between the measuring telescope objective and the viewing aperture 5 of the ocular there is mounted a prism 8 having a reflecting surface 8a perpendicular to the optical axis 3 of the ocular and spaced from the aperture 5. The prism 8 is provided with roof faces 8b and 8c which intersect along a common edge 8d. The prism 8 also comprises an entering face 8e through which the light rays of the measuring telescope enter the prism and a surface 8f which is inclined with respect to the optical axis 3 of the ocular.

The roof faces 8b and 8c together with their edge 8d are so inclined with respect to the prism surface 8a and the axis of the objective 7 that the light rays entering surface 8e into the prism 8 are reflected against the surface 8a at such an angle that all of these measuring rays are totally reflected by the surface 8a.

A prism surface 8f is so inclined with respect to the ocular optical axis 3 or the prism reflecting surface 8a that the measuring light rays totally reflected by the surface 8a pass through the prism surface 8f. The measuring telescope objective 7 produces an intermediate image in an intermediate image plane indicated at 9.

Also in the ocular optical axis 3 and in front of the prism 8 there is positioned a three-sided prism 10 having a completely reflecting concave surface 10a which faces the ocular aperture 5. The prism 10 has a surface 10b which is positioned in parallel with the prism surface 8f and spaced therefrom to define an air gap 11. There is a third prism surface 10c which is positioned at or in the vicinity of intermediate image plane 9 of the measuring telescope and upon which there is formed a reflecting surface 12 for the measuring image. The reflecting surface 12 may be completely reflecting or partially reflecting and reflects the measuring light rays which are totally reflected by the prism surface 8a into the path of light rays of the view finder towards the total reflecting surface 10b.

The concave reflecting surface 10a and the total reflecting surface 10b are so inclined with respect toward each other and with respect to the ocular optical axis 3 that when the light rays are passing to the ocular they are reflected from the intermediate image 9 by the total reflecting surface 10b onto the concave reflecting surface 10a and then through the total reflecting surface 10b to the ocular aperture 5.

The view finder telescope comprises a prism 13 having roof surfaces 13b and 13c which intersect at the common edge 13a. These roof surfaces 13b and 13c and the edge 13a reflect the light rays entering the view finder aperture 3 into the direction of an objective 14 and 14a which produces an intermediate image in an intermediate image plane indicated at 15. The intermediate image plane 15 intersects with the intermediate image plane 9 of the measuring telescope at a common point along the optical axis IIa of the view finder telescope.

The range finder intermediate image plane 9 and the view finder intermediate image plane 15 are inclined with respect to each other by an angle which is dependent upon the use of the prism surfaces 8f and 10b as penetrated surfaces and of the prism surface 10b as a total reflecting surface. The reflector 12 of the measuring image is centrally positioned in the path of the light rays of the telescopic view finder and is so small that in spite of its inclined position toward the view finder intermediate image it appears sharply and clearly defined to the viewer together with the view finder image.

The prism surface 10c of the prism 10 upon which the reflector 12 is located has cemented thereon a prism wedge 16 the wedge angle of which corresponds to the inclination angle of the intermediate image planes 9 and 15 with respect to each other. The prism wedge 16 has a surface 16a which is perpendicular with respect to the optical axis 2a of the telescopic view finder and is coordinated to the three-sided prism 10.

In front of the prism surface 16a and as close to this surface as possible there is positioned a diaphragm 17 for the field of vision. This diaphragm is variable in the size of opening and position as a function of the adjustments in the objective and adjustments for the distance. Thus, the variation of the aperture opening accounts for different focal lengths of the objective as well as fading of the image field and the variation of its position in the intermediate image plane takes into account the parallax effect.

It is also possible to provide the reflector surface 16a with image field limiting marks which are then always visible in the telescopic finder and are sharply seen by the viewer together with the intermediate images. The measuring adjustment of this coinciding type range finder is accomplished by transversely displacing the measuring objective 7 with respect to the range finder optical axis I.

Such an adjusting arrangement is known in range finders and thus only schematically indicated in the drawings by a lever 19 which is pivotable about a stationary axis 18. The lever arm 19a of the lever 19 is operatively connected with a cam 6a of the camera objective 6. The lever arm 19b thus adjusts the measuring objective 7 and the lever arm 19c varies the size and position of the diaphragm 17 in response to adjustment of the objective 6.

The measuring intermediate image, which is reversed, is inverted by the prism surfaces 8a, 8b, 8c and 8d. The view finder image is inverted by the prism surfaces 13a, 13b, 13c of the angular prism 13 and at the total reflecting surface 10b of the prism 10.

In the modification of FIGURE 2 the intermediate image planes of the range finder and view finder telescopes are spaced from each other. In this modification the view finder telescope optical arrangement is similar to that shown in FIGURE 1 and forms an intermediate image indicated at 15a. However, the combining of the light rays from the range finder with those of the view finder is accomplished by the use of two prisms 20 and 21, the base surfaces 20a and 21a of which are parallel to each other and are spaced from each other to define an air gap 11a. These base surfaces are both positioned in the ocular optical axis III.

The prism 20 has a concave reflecting surface 20b positioned to one side of the ocular and facing the intermediate image plane 15 of the view finder. The third face of the prism 20 is indicated at 20c and is perpendicular to the ocular axis III. The base surface 20a is the total reflecting surface and is coordinated to the concave reflecting surface 20b.

The prism 21 is provided with a curved surface 21b positioned opposite to the concave reflecting surface 20b of the prism 20 in the direction of the view finder axis IIa. A central reflector 22 for the measuring image is positioned on the curved prism surface 21b.

On the third side 21c of the prism 21 there is mounted a central prism 23 having a reflector coated surface 23a. In front of the prism 23 there is positioned the telescope objective 24 of the measuring telescope which objective is constructed with an extended back focal length. Connected to the telescope objective 24 is a pentaprism 25 located in the range finder axis I and having roof surfaces 25b, 25c, intersecting along a common edge 25a and a reflector surface 25d.

With this telescope arrangement the light rays entering the range finder aperture 2 are received by the prism 25 and reflected by the reflector surface 25d to the objective 24 into the prism 23, where the reflecting surface 23a reflects the light rays into the prism 21.

The measuring reflector 22 is located between the intermediate image plane 26 of the measuring objective 24 and the intermediate image plane 15a of the telescopic view finder 14, 14a. The reflector 22 is so inclined with respect to the optical axis IIa of the view finder and the base surface 21a of the prism 21, and the base surface 21a is so inclined with respect to the reflecting surface 23c of the prism 23, that the measuring light rays impinging on the prism 21 are totally reflected by the base surface 21a in the direction of the reflector 22. The reflector 22 then reflects the measuring light rays to the concave reflecting surface 20b, whereby the light rays pass through the base surfaces 21a and 20a of the two prisms 21 and 20. Because of its curvature the reflector 22 acts as a condensing lens in the path of the range finder light rays. The position of the reflector 22 between the intermediate image planes 15a and 26 is such that the measuring image from the reflector 22 is sharply defined to the viewer together with the intermediate image of the telescopic view finder. Also the intermediate image of the measuring telescope appears in its horizontal position in the image plane 15a of the telescopic view finder.

The view finder light rays moving along the optical axis 11a to the concave reflecting surface 20b of the ocular pass through the base surfaces 21a and 20a in the same manner. The concave reflector 20b reflects the combined view finder and range finder light rays to the base surface 20a by which they are totally reflected toward the ocular along the axis III.

Cemented onto the curved prism surface 21b is a correspondingly shaped prism wedge 27 having a planar surface 27a which is perpendicular to the view finder optical axis IIa and is the incident surface for these light rays.

The adjustment of the measuring objective 24 and the diaphragm 17 in order to compensate for different focal lengths of the objective, finder parallax, and fading of the image field are carried out in the same manner as described in connection with FIGURE 1 by the schematically drawn lever systems 19, 19a, 19b, 19c.

The inversion of the view finder light rays is carried out in the same manner as described for the embodiment of FIGURE 1 by the bevel surfaces 13b, 13c of the prism 13 and the total reflecting surface 20a of the prism 20.

The inversion of the range finder or measuring light rays is carried out by the reflector surface 25d and the roof surfaces 25b and 25c of the pentaprism 25 together with the reflector 23a of the prism 23 in combination with the mutually neutralizing effects of the total reflecting prism surfaces 20a and 21a. Thus, the total reflecting surface 20a acts to invert both the view finder image as well as the range finder image.

An adjustable or exchangeable ocular lens 28 can be coordinated to the viewing aperture 5 in order to favorably influence the eye position or to act as a diopter lens adapted to the eye of the user. Such an ocular lens can be employed in the structures of both FIGURES 1 and 2.

The coinciding type range finder of the present invention can be further modified so that the intermediate images formed by the range finder and view finder are of the same size. A partly transparent reflector having at least the size of the intermediate images of the finders is then provided instead of the small central reflector used for the measuring light rays. The measuring process is then carried out as a combined image and measuring with the entire view finder image. When the two partial images coincide a view finder image of a natural intensity of illumination is produced according to the light characteristics of the range finder and view finder telescopes.

The total reflecting surface which is coordinated to the concave reflecting surface may be curved in order to correct any defects in the images.

Thus, it can be seen that the present invention provides a coinciding type range finder for photographic cameras having a compact arrangement of the optical elements so that the distance occupied along the optical axis of the camera by the optical system is relatively short.

It will be understood that this invention is susceptible to further modification and, accordingly, it is desired to comprehend such modifications within this invention as may fall within the scope of the appended claims.

What is claimed is:

1. A range finder and view finder for a photographic camera comprising; a casing having front and rear walls, said rear wall having an eyepiece aperture therein, said front wall having a range finder aperture and a spaced view finder aperture therein, a first prism positioned between said eyepiece aperture and range finder aperture and having an entrance surface receiving light rays from said range finder aperture, an exit surface on said first prism adjacent to said eyepiece aperture and perpendicular to the optical axis thereof, a base surface inclined to said exit surface, and roof surfaces forming a common edge and being inclined to said exit surface so that the light rays from said entrance surface are reflected by said roof surfaces on to said exit surface wherefrom they are totally reflected towards and through said base surface, a second prism having a concave mirror coated surface and a base surface with both said surfaces positioned in the optical axis of said eyepiece aperture, the base surface of said second prism being positioned adjacent to the base surface of said first prism to form an air gap therebetween, an entrance surface on said second prism adapted for receiving light rays from said view finder aperture. Optical means comprising an angular roof prism and telescopic objective lens means between said view finder aperture and said entrance surface on said second prism for reflecting light received from said view finder aperture towards said last named entrance surface and for forming a view finder intermediate image adjacent to said last named entrance surface, telescope objective lens means adapted for receiving light rays from said range finder aperture to form an intermediate image adjacent to said entrance surface of said second prism, a range finder mirror means arranged upon the said entrance surface of said second prism adjacent to the plane of the range finder intermediate image, said range finder mirror reflecting the light rays from said range finder aperture towards said base surface and said concave mirror coated surface of said second prism thereby combining the light rays from said range finder and view finder apertures, the said concave mirror coated surface and said base surface of said second prism being so inclined with respect to each other and to the optical axes of the view finder telescopic objective lens means and the eyepiece aperture that the combined light rays from said intermediate images and said range finder mirror means impinging upon the said base surface are reflected by total reflection towards said concave mirror coated surface from where said light rays are reflected towards said eyepiece aperture opening, said light rays reflected by said concave mirror coated surface passing through said air gap, said concave mirror coated surface serving as the eyepiece for observing the said intermediate images and the said range finder mirror means.

2. A range finder and view finder for a photographic camera comprising; a casing having front and rear walls, said rear wall having an eyepiece aperture therein, said front wall having a range finder aperture and a spaced view finder aperture therein, a first prism having a base surface and an exit surface positioned in the optical axis of said eyepiece aperture and a concave mirror coated surface, a second prism between said concave mirror coated surface and said view finder aperture and having a base surface spaced from the base surface of said first prism to form an air gap therebetween, said second prism further having a first entrance surface directed towards said view finder aperture and a second entrance surface, a third angular prism mounted on said second entrance surface of said second prism, optical means including a telescope objective means and a pentaprism having a mirror coated surface and roof surfaces adapted for receiving light rays from said range finder aperture and reflecting said light rays into said third prism, said third prism being adapted to reflect said light rays into said second prism for forming a range finder intermediate image adjacent to said first entrance surface of said second prism, range finder mirror means adjacent to said first entrance surface of said second prism to reflect said light rays from said range finder aperture onto said concave mirror coated surface of said first prism, and further optical means comprising telescope objective lens means and an angular roof prism having roof surfaces for receiving light rays from said view finder aperture and for reflecting said last named light rays into said second prism to form a view finder intermediate image adjacent to said first entrance surface of said second prism, said concave mirror coated surface of said first prism and the said base surfaces forming said air gap being so inclined with respect to one another and being further inclined to the optical axis of said view finder telescope objective lens means, to said range finder mirror means, and to the optical axis of said eyepiece aperture so that the said light rays from said range finder aperture entering said second prism and impinging onto the base surface of said second prism are reflected by total reflection towards said range finder mirror means and that the rays from said intermediate images and from said range finder mirror means pass through said air gap for impinging onto said concave mirror coated surface of said first prism from which surface they are reflected towards the air gap limiting base surface of said first prism and then reflected by total reflection from said last surface towards said eyepiece aperture, the said concave mirror coated surface of said first prism serving as an eyepiece for observing said intermediate images and said range finder mirror means.

3. The range finder and view finder as claimed in claim 1 wherein said entrance surface of said second prism is inclined to the optical axis of the telescope objective lens means between said view finder aperture and said entrance surface of said second prism and has said range finder mirror means thereon, a prism wedge cemented on said entrance surface of said second prism to provide an entrance surface which is perpendicular to the optical axis of the last named telescope objective lens means.

4. The range finder and view finder as claimed in claim 3 in which said entrance surface of said second prism and said range finder mirror means are curved whereby said range finder mirror means acts as a condenser mirror lens for the rays from said range finder aperture and wherein said prism wedge has a curved surface cemented to said last named entrance surface.

5. The range finder and view finder as claimed in claim 4 in which said range finder mirror means is a semitransparent mirror coating upon the said entrance surface of said second prism receiving the light rays from the telescope objective lens means of the range finder aperture, said semitransparent mirror coating having at least the same size as the intermediate image formed adjacent to said last named entrance surface by said view finder telescope objective lens means.

6. The range finder and view finder as claimed in claim 5 further comprising variable diaphragm means positioned adjacent to the plane of said last named intermediate image, and means to vary the size of the diaphragm aperture and its position in its own plane.

7. The range finder and view finder as claimed in claim 6 further comprising a removable eyepiece lens positioned in said eyepiece aperture and coordinated to the said concave mirror coated surface adapting the latter to a combined eyepiece and serving as a correction lens.

8. The range finder and view finder as claimed in claim 2 wherein said first entrance surface of said second prism is inclined to the optical axis of the telescope objective lens means receiving light from said view finder aperture and is provided with said range finder mirror means, and a prism wedge cemented on said last named entrance surface to provide an entrance surface which is perpendicular to the optical axis of said last named telescope objective lens means.

9. The range finder and view finder as claimed in claim 8 in which said first entrance surface of said second prism and said range finder mirror means are curved whereby said range finder means acts as a condenser mirror lens for the rays from said range finder aperture and wherein said prism wedge has a curved surface cemented with said curved first entrance surface of said second prism.

10. The range finder and view finder as claimed in claim 9 in which said range finder mirror means is a semitransparent mirror coating upon said first entrance surface of said second prism receiving light rays from the telescopic objective lens means of the range finder aperture, said semitransparent mirror coating having at least the same size as the intermediate image formed adjacent to said last named entrance surface by said view finder telescope objective lens means.

11. The range finder and view finder as claimed in claim 10 further comprising variable diaphragm means positioned adjacent to the plane of said last named intermediate image, and means to vary the size of the diaphragm aperture and its position in its own plane.

12. The range finder and view finder as claimed in claim 11 further comprising a removable eyepiece lens positioned in said eyepiece aperture and coordinated to the said concave mirror coated surface adapting the latter to a combined eyepiece and serving as a correction lens.

References Cited

UNITED STATES PATENTS

| | | | |
|---|---|---|---|
| 2,960,907 | 11/1960 | Leitz | 88—2.7 |
| 2,984,145 | 5/1961 | Papke et al. | 88—2.4 |
| 2,992,599 | 7/1961 | Jurenz. | |

OTHER REFERENCES

Naumann: German application 1,056,472, printed Apr. 30, 1959, K1.57a9/05.

Friebe: German application 1,090,083, printed Sept. 29, 1960, K1.57a9/05.

DAVID H. RUBIN, *Primary Examiner.*